(12) United States Patent
Zeamari et al.

(10) Patent No.: US 9,391,701 B2
(45) Date of Patent: Jul. 12, 2016

(54) METHOD AND SYSTEM FOR NEGOTIATION OF A PARAMETER OF AN OPTICAL COMMUNICATION PROTOCOL BETWEEN TWO DEVICES

(71) Applicant: GEMALTO SA, Meudon (FR)

(72) Inventors: Ali Zeamari, La Ciotat (FR); Jacques Dubrois, La Ciotat (FR); Abdellah El Marouani, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/771,644

(22) PCT Filed: Mar. 3, 2014

(86) PCT No.: PCT/EP2014/054044
§ 371 (c)(1),
(2) Date: Aug. 31, 2015

(87) PCT Pub. No.: WO2014/154445
PCT Pub. Date: Oct. 2, 2014

(65) Prior Publication Data
US 2016/0006506 A1    Jan. 7, 2016

(30) Foreign Application Priority Data

Mar. 29, 2013   (EP) ..................................... 13305410

(51) Int. Cl.
*H04B 10/00* (2013.01)
*H04B 10/116* (2013.01)
(Continued)

(52) U.S. Cl.
CPC ................ *H04B 10/116* (2013.01); *G06K 9/46* (2013.01); *G06K 9/4652* (2013.01); *G06T 7/0044* (2013.01); *H04B 10/1143* (2013.01); *H04L 12/6418* (2013.01)

(58) Field of Classification Search
CPC ............ H04B 10/116; H04B 10/1143; H04B 10/114; H04B 10/1149; H04B 10/40; H04B 10/112; H04B 10/1123; H04B 10/11

USPC ......... 398/118, 119, 123, 124, 128, 129, 130, 398/131, 172, 202, 208, 158, 159, 162, 182, 398/183, 135, 136; 348/207, 207.11, 348/207.99

See application file for complete search history.

(56) References Cited

U.S. PATENT DOCUMENTS 5,570,297 A     10/1996   Brzezinski et al.
8,213,801 B2 *   7/2012   Nien .................. H04B 10/1141
                                                        398/118

(Continued)

FOREIGN PATENT DOCUMENTS

WO    WO 2011/137100 A1    11/2011

OTHER PUBLICATIONS

International Search Report (PCT/ISA/210) mailed on Jul. 11, 2014, by the European Patent Office as the International Searching Authority for International Application No. PCT/EP2014/054044.

(Continued)

*Primary Examiner* — Hanh Phan

(74) *Attorney, Agent, or Firm* — Buchanan Ingersoll & Rooney PC

(57) ABSTRACT

The invention is a method for negotiating a parameter of an optical communication protocol between two devices. One device displays a first calibration image comprising a series of pixel patterns having a predetermined position and different sizes. The other device takes a first calibration picture of the first calibration image, identifies a set comprising at least one detectable pixel pattern in the first calibration picture and selects a setting data based on the set. Then it displays a second calibration image comprising this setting data which is read by the first device via another calibration picture. The first device retrieves the setting data from the calibration picture, selects a value based on the setting data and updates the parameter with the selected value.

10 Claims, 4 Drawing Sheets

(51) Int. Cl.
*H04B 10/114* (2013.01)
*H04L 12/64* (2006.01)
*G06K 9/46* (2006.01)
*G06T 7/00* (2006.01)

(56) References Cited

U.S. PATENT DOCUMENTS

| | | |
|---|---|---|
| 8,231,054 B1 | 7/2012 | Kim |
| 2009/0010654 A1 | 1/2009 | Shin et al. |
| 2009/0028558 A1 | 1/2009 | Choi et al. |
| 2009/0052902 A1 | 2/2009 | Shinokura |
| 2011/0069971 A1 | 3/2011 | Kim et al. |
| 2012/0155889 A1* | 6/2012 | Kim ............... H04B 10/116 398/193 |
| 2012/0224864 A1 | 9/2012 | Walewski |

OTHER PUBLICATIONS

Written Opinion (PCT/ISA/237) mailed on Jul. 11, 2014, by the European Patent Office as the International Searching Authority for International Application No. PCT/EP2014/054044.

* cited by examiner

METHOD AND SYSTEM FOR NEGOTIATION OF A PARAMETER OF AN OPTICAL COMMUNICATION PROTOCOL BETWEEN TWO DEVICES

FIELD OF THE INVENTION

The present invention relates to methods for communicating using an optical communication protocol. It relates particularly to methods for allowing a communication between two devices through an optical protocol based on images.

BACKGROUND OF THE INVENTION

Several devices may exchange data using a contactless communication protocol. For example, devices may communicate using Near Field Communication (NFC) or Wi-Fi. For being able to communicate through contactless protocols, the devices must have communication means able to manage a contactless communication using an electromagnetic field and an antenna.

A large number of existing electronic devices are devoid of contactless communication means. Many of these devices have a display and a camera.

There is a need for allowing a contactless communication between two devices having a display and able to take a picture.

SUMMARY OF THE INVENTION

An object of the invention is to solve the above mentioned technical problem.

The object of the present invention is a method for negotiating a parameter of an optical communication protocol to be used between first and second devices. The method comprises the following steps:

said first device generates and displays a first calibration image comprising a series of pixel patterns, each of said pixel patterns having a predetermined position relative to the other pixel patterns and a size different from the size of the other pixel patterns of the series, said second device takes a first calibration picture of the first calibration image, analyses the first calibration picture, identifies a set comprising at least one detectable pixel pattern which is properly recognizable by the second device and selects a setting data based on said set, said second device generates and displays a second calibration image comprising the setting data, said first device takes a second calibration picture of the second calibration image, interprets the second calibration picture, gets the setting data, selects a value based on the setting data and updates the parameter with the value.

Advantageously, the set may comprise the smallest detectable pixel pattern.

Advantageously, said first calibration image may comprise a plurality of colored pixel patterns, each of said colored pixel patterns having a different color and the set may comprise the colored pixel patterns having a color which can be differentiated by said second device.

Advantageously, said first calibration image may comprises a reference pattern having a predefined position in said first calibration image and said second device may detect the orientation of the first calibration picture with said reference pattern.

Advantageously, said second calibration image may comprise a second series of pixel patterns, each pixel pattern of said second series having a predetermined position relative to the other pixel patterns of said second series. Said first device may identify a second set comprising at least one detectable pixel pattern of said second series which is properly recognizable by the first device into said second calibration picture. Said first device may select the value based on both the setting data and the second set.

Advantageously, the method may comprise the further steps:

said first device generates and displays a command image comprising a command, said second device takes a command picture of the command image, interprets the command picture, retrieves the command and generates a result by executing the command, said second device generates and displays a response image comprising the result, said first device takes a response picture of the response image, interprets the response picture, gets the result and associates the result with the command, and the command may be coded into the command image through a combination of detectable pixel patterns belonging to said set.

Another object of the invention is a system comprising first and second devices. Each device comprises a screen able to display images composed of pixels and a sensor means able to take a picture of an image. Said first and second devices are configured to communicate using an optical communication protocol. Said first device comprises an initiator means configured to generate and to display a first calibration image comprising a series of pixel patterns, each of said pixel patterns having a predetermined position relative to the other pixel patterns and a size different from the size of the other pixel patterns of the series. Said second device comprises a calibration means configured to analyze a calibration picture corresponding to the calibration image, to identify a set comprising at least one detectable pixel pattern which is properly recognizable by the second device and to select a setting data based on said set. Said second device comprises a negotiating means configured to generate and display a second calibration image comprising the setting data. Said first device comprises a setting means configured to interpret a second calibration picture corresponding to said second calibration image, to get the setting data, to select a value based on the setting data and to update a parameter of the optical communication protocol with the value.

Advantageously, said first device may comprise a coding means configured to code a command as a combination of pixel patterns into a command image. Said first device may comprise an analyzing means configured to interpret a response picture taken by its sensor means, to retrieve a result from said response picture and to associate the result with the command. Said second device may comprise a parsing means configured to interpret a command picture taken by its sensor means and to retrieve a command from said command picture. Said second device may comprise a running means configured to generate a result by executing the command and said second device may comprise a generating means configured to generate a response image comprising the result.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to all kinds of devices which comprise a display and a sensor able to take a picture on the same side. For instance, the invention may apply to any combination of devices like mobile phones, Personal Computers, Tablet PCs, gaming devices, TVs or any computers with a display and a camera.

Figure 2:
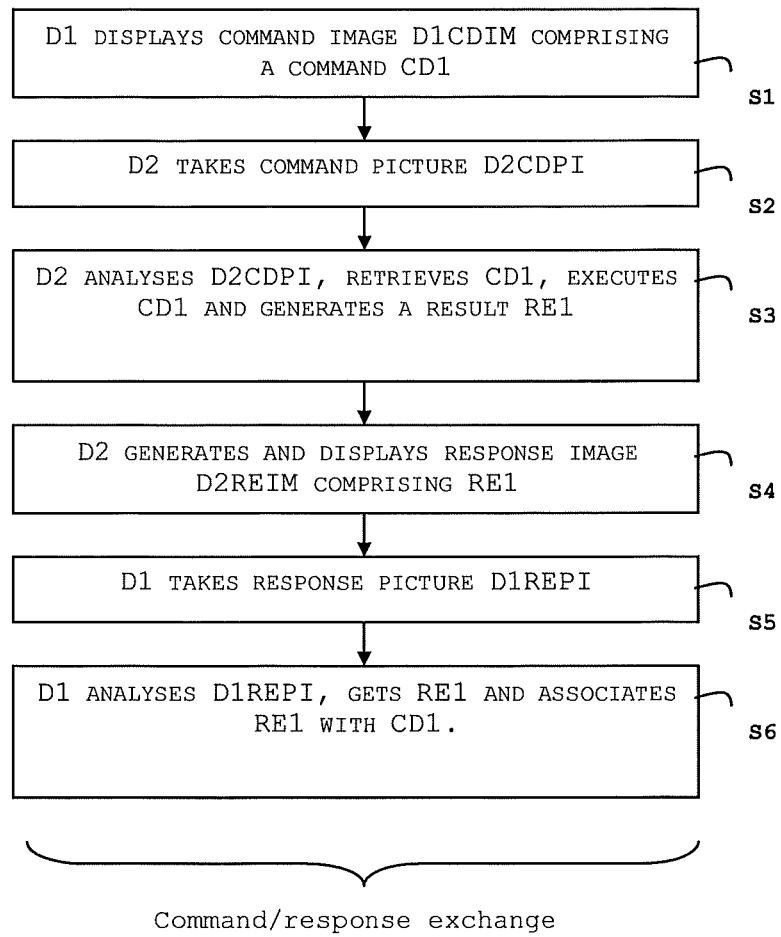
FIG. 2 is an example of a flowchart for the phase of command/response exchange using the protocol parameter set according to the invention.

FIG. 2 shows an example of a flowchart wherein two devices exchange a couple command-response using the optical communication protocol using the protocol parameter set according one aspect of the invention.

In this example, the first device D1 is a personal computer while the second device D2 is a smart phone. The user of the smart phone D2 places his phone so that its camera can take a picture of the screen of the device D1 and the screen of the phone is almost in front the camera of the device D1.

These devices are assumed to already know the parameters of the optical communication protocol. These parameters may be defined during a previous phase of negotiation as described at FIG. 1. Alternatively, these parameters may be preset and stored in both devices.

In order to initiate a communication session, the user of the device D1 and the user of the device D2 are assumed to start the appropriate mode on their devices.

For sending the command CD1, the device D1 generates a so-called command image D1CDIM which comprises the command CD1. The command CD1 is coded into the image D1CDIM using the selected protocol parameters. The device D1 displays the command image D1CDIM on its screen at step S1.

For example, the command CD1 may be a command allowing to share a digital business card between two phones or between a handset and a tablet computer. The command CD1 may be a command allowing a tablet-PC to access a secured content stored in TV. The command CD1 may be a command allowing establishing a multimedia channel between a TV and a smart phone.

Between two handsets, the command CD1 may be an APDU command as defined by ISO7816 standard like SELECT: 00A4040008 A000112244550001.

The command CD1 may be used to send data to be processed by the device D2, to retrieve data from device D2 or to start the execution of a treatment in device D2.

Regarding the coding of image, the device D1 may use pixel pattern having 16 colors. In this case, one byte may be coded through two pixel patterns. With reference to the Select command, the following correspondence may be used:

00=1 Pixel Black and 1 Pixel Black
A4=1 Pixel Orange and 1 Pixel Red
. . .
01=1 Pixel Black and 1 Pixel Blue In the above-described examples, the device D1 is the master. In other words, the device D1 is the sender of the command. The invention is not limited to this model. The initiation can be done by the user of any device. The user set a device in appropriate mode (e.g. master if device is initiator of communication or slave otherwise).

At step S2, the device D2 takes a so-called command picture D2CDPI of the image D1CDIM.

The quality of the picture can vary in particular according to the angle of the shot, the distance and the ambient brightness. At this stage we can assume that the selected protocol parameters are compatible with the conditions of the photo shoot. Therefore, the content of the picture D2CDPI is similar to the content of the image D1CDIM.

At step S3, the device D2 analyzes the content of the picture D2CDPI and retrieves the command CD1. The device D2 executes the command CD1 and generates a result RE1 for the execution of the command CD1.

At step S4, the device D2 generates a so-called response image D2REIM which comprises the result RE1. The result RE1 is coded into the image D2REIM using the selected protocol parameters.

In a preferred embodiment, both device D1 and D2 encode the command CD1 and the result RE1 in the same way. Alternatively, the device D1 may use a subset of the selected protocol parameters for coding the command CD1 while the device D2 may use another subset of the selected protocol parameters for coding the result RE1. In other words, the protocol parameters may define a first set of values for outgoing messages and a different set of values for incoming messages.

The device D2 displays the response image D2REIM on its screen. The device D1 takes a so-called response picture D1REPI of the image D2REIM at step S5.

As explained above, the content of the picture D1REPI is assumed to be similar to the content of the image D2REIM.

At step S6, the device D1 analyzes the content of the picture D1REPI and retrieves the result RE1. The device D1 associates the result RE1 with the command CD1 so that the result RE1 is considered as being the result of the execution of the command CD1 by the device D2.

Advantageously, the device D1 starts shooting when it displays the command image D1CDIM and continues until a new image is detected on the screen of the device D2. Thus, when the device D2 displays a response image, the device D1 can quickly detect that a new image has been shown by the device D2. The same way the device D2 periodically takes pictures until it detects a command image displayed by the device D1.

Advantageously, a command image may comprise several commands and a response image may contain several results of command execution.

Advantageously, a command may be coded through several command images. It may be useful for commands having a very large size. In this case, the device D2 displays an acknowledgement image instead of a response image so that the device D1 is able to display the next command image. Such a plurality of command images may be useful for sending a huge amount of data to another device. For instance, a plurality of command images can be used for sending a video file.

Advantageously, the device D1 may manage a transaction by sending a plurality of commands to the device D2 through a series command images.

Advantageously, the device D2 may include in the response image a command for the device D1 so that commands are sent in both directions.

Alternatively, the transfer direction can change with a dedicated image "change transfer direction" which triggers the exchange of the role of master and slave between the two devices.

Figure 1:
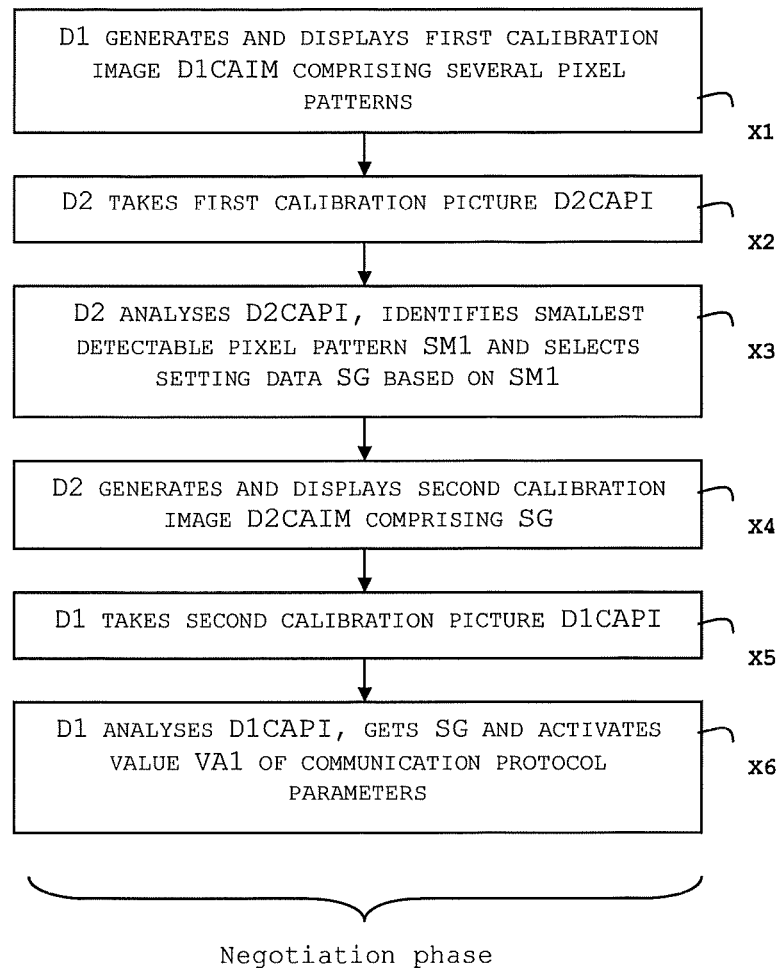
FIG. 1 is an example of a flowchart for the phase of negotiation of protocol parameter according to one aspect of the invention.

FIG. 1 shows an example of a flowchart for a phase of negotiation of protocol parameters according to one aspect of the invention.

In order to negotiate the relevant parameters to be used for the communication protocol, the devices D1 and D2 may run a negotiation phase prior to exchange command and response.

First, the device D1 generates a so-called calibration image D1CAIM which comprises a series of pixel patterns having a predetermined position relative to other pixel patterns.

Figure 3:
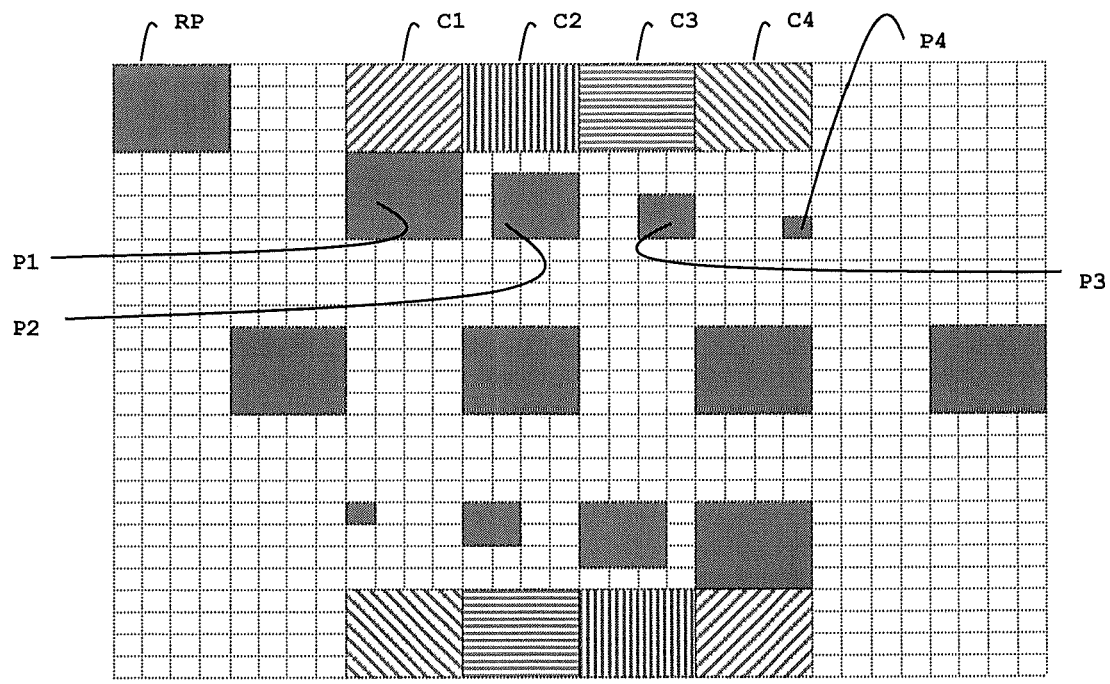
FIG. 3 depicts schematically an example of a calibration image displayed during the phase of negotiation of protocol parameters according to one aspect of the invention.

A pixel pattern is a set of one or several pixels having a specific size and shape. FIG. 3 shows an example of a calibration image comprising the pixel patterns P1, P2, P3 and P4. P1 is a black square made of 16 pixels. P2 is a black square made of 9 pixels. P3 is a black square made of 4 pixels and P1 is a single black pixel.

The device D1 displays the calibration image on its screen at step X1.

The device D2 take a so-called calibration picture D2CAPI of the image D1CAIM at step X2.

As described above, the quality and the content of the picture can vary according to multiple elements like the angle of the shot, the distance between the devices or settings specific to the screen and settings specific to the camera on each side. At this stage we can assume that the relative speed of the device D1 relative to the device D2 is sufficiently low not to disturb the shooting. Consequently, the content of the picture D2CAPI is similar to the content of the image D1CAIM, with the exception of items which cannot be properly recognized by the sensor of device D2. In others words, the content of the calibration picture D2CAPI is a subset of the content of the calibration image D1CAIM. For instance, the calibration picture D2CAPI does not contain items too small to be properly recognized by the sensor of device D2.

At step X3, the device D2 analyzes the content of the calibration picture D2CAPI and identifies a set ST of detectable pixel patterns. For instance and by reference to FIG. 3, the device D2 may recognize the pixel patterns P1, P2 and P3 only. In this case, the pixel pattern P4 is too small to be detected by the sensor of the device D2.

Figure 4:
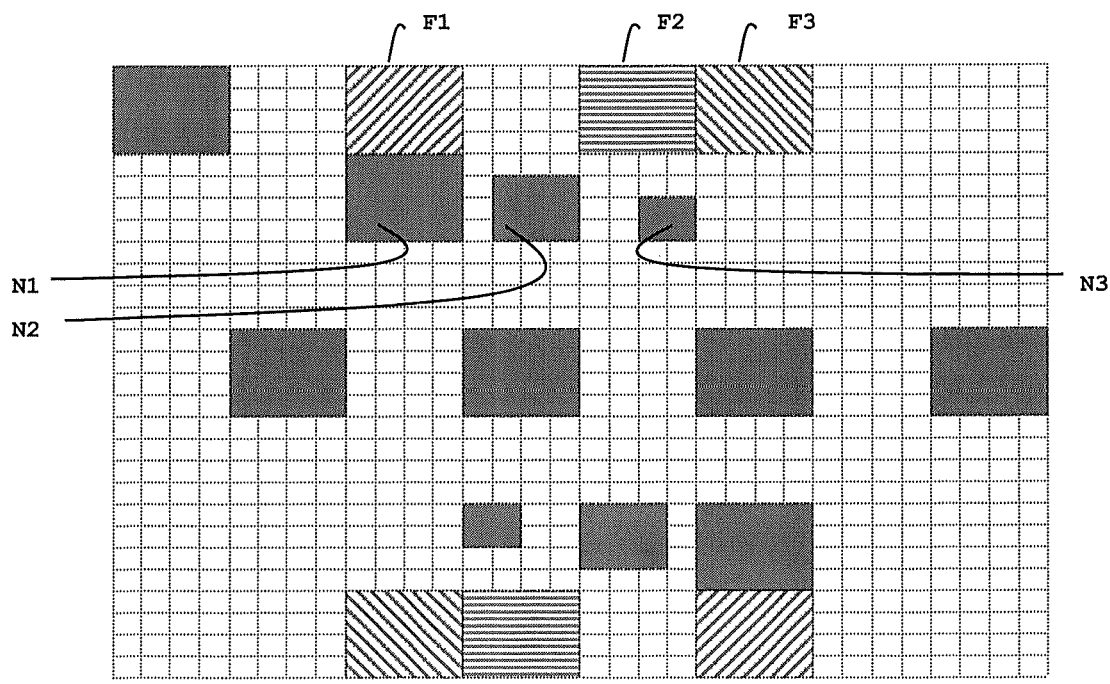
FIG. 4 depicts schematically a second example of a calibration image displayed during the phase of negotiation of protocol parameters according to another aspect of the invention.

The device D2 selects a setting data SG based on the previously identified set ST of pixel patterns. At step X4, the device D2 generates another so-called calibration image D2CAIM comprising the setting data SG. FIG. 4 shows an example of a calibration image D2CAIM. In this case, the setting data SG comprise three pixel patterns N1, N2 and N3 which correspond to the pixel patterns P1, P2 and P3 detected in the calibration picture D2CAPI.

The device D2 displays the calibration image D2CAIM on its screen. The device D1 takes a further so-called calibration picture D1CAPI of the calibration image D2CAIM at step X5.

As explained above, the content of the calibration picture D1CAPI may be different from the content of the calibration image D2CAIM.

At step X6, the device D1 analyzes the content of the calibration picture D1CAPI and retrieves the setting data SG. In the example of FIG. 4, the device may get the three pixel patterns N1, N2 and N3. Based on the received setting data SG, the device D1 selects a value VA1 to be used for parameters of the communication protocol. For example, the value VA1 may be the smallest detectable pixel pattern N3. So, the future commands will be coded using pixel patterns having a size of 4 pixels.

Advantageously, the device D1 may perform an analysis similar to the one described at step X3 of FIG. 1. In other words, the device D1 can identify a second set ST2 comprising the detectable pixel pattern found in the calibration picture D1CAPI. This set ST2 may differ from the set ST. Thus the device D1 may select the value VA1 using both sets or using the setting data SG and the second set ST2.

Advantageously, both devices D1 and D2 may use the same value VA1 for the further communication exchanges in both directions. For example, devices D1 and D2 may code their images using the same smallest detectable pixel pattern.

Alternatively, the devices D1 and D2 may use distinct values of protocol parameter depending on the sender and the receiver. For example, the pixel pattern N3 may be the smallest pixel pattern for the sensor of device D2 while the pixel pattern P4 is the smallest pixel pattern for the sensor of device D1. Thus the device D1 may code its images using a 4-pixel square while the device D2 may code its images using a single pixel.

Advantageously, the calibration images may contain colored pixel patterns. Each of these colored pixel patterns has its own color. Preferably, each colored pixel pattern has a unique color. When analyzing the content of the calibration picture D2CAPI, the device D2 identifies the colored pixel patterns whose color can be differentiated from other. Thus the set ST may comprise the detectable pixel patterns and the colored pixel patterns having a recognizable color. Consequently, the parameters of the communication protocols may take colored pixel pattern into account allowing coding of command though colored pixel patterns. Using colored pixel pattern, an image can contain an amount of data larger than with a black/white model of pixel pattern.

FIG. 3 shows a calibration image comprising four colored pixel patterns C1, C2, C3 and C4. FIG. 4 shows another calibration image comprising three colored pixel patterns F1, F2 and F3. According to the previously described example, the calibration image of FIG. 4 is displayed by the device D2 in response to the calibration image of FIG. 3 displayed by the device D1. In this case, the colored pixel patterns F1, F2, F3 correspond to pixel patterns C1, C3, respectively C4.

Although the examples given indicate four pixel patterns, the invention is not limited to a particular number of pixel patterns and can be applied with any number of pixel patterns.

Advantageously, each image displayed by the devices may contain a reference pattern having a predefined position in the image. The reference pattern is assumed to have preset size and shape. When analyzing a picture corresponding to an image, a device can find the orientation of the picture with the reference pattern. For example, at FIG. 3, the image contains a reference pattern RP in the form of a square of 4×4 pixels in the upper left corner. The other three corners are empty. A reference pattern may be used for all kinds of image: command image, response image, acknowledgement image and calibration image.

Advantageously, the images may contain redundant data, such as a form of sub-mirror. The image thus comprises two symmetrical parts with the exception of the reference pattern. Thanks to the redundant data, it is possible to use the picture even if part of it is not available.

Advantageously, the images may contain integrity data allowing checking that the picture has not been altered.

Advantageously, a command image can contain a ciphered command so that confidentiality is guaranteed. In this case the sender device and the receiver device are configured to cipher/decipher data according to a common security scheme. Such security models are well known in particular in the domain of smart cards and mobile phones.

Advantageously, a command image can contain a calibration part used by the receiver device for checking the conveyed command. For instance, a command image may contain a reminder of the used colored pixel patterns (if any) and of the selected pixel pattern(s) (i.e. the smallest pixel pattern in a preferred embodiment) which are used for coding the command.

Figure 5:
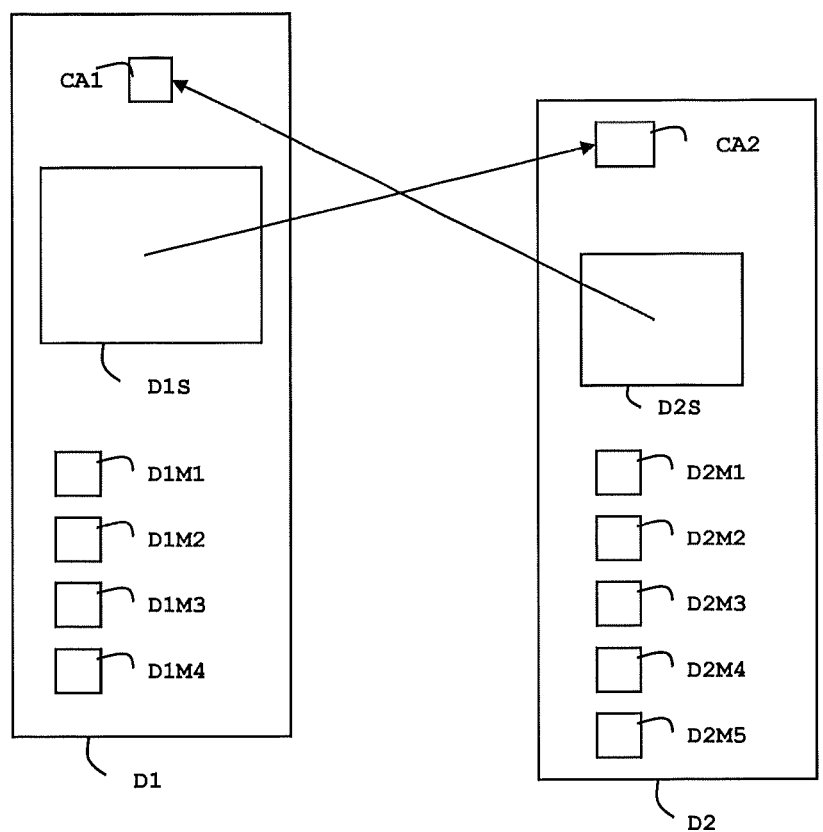
FIG. 5 depicts schematically a system comprising two devices able to use the communication protocol according to an aspect of the invention.

FIG. 5 shows schematically an example of a system comprising the devices D1 and D2 which are able to use the communication protocol according to an aspect of the invention.

The device D1 comprises a screen D1S able to display images composed of pixels and a sensor CA1 able to take a picture of an image. The device D1 comprises a coding means D1M1 configured to code a command as a combination of pixel patterns into a command image. The device D1 comprises an analyzing means D1M2 configured to interpret a response picture taken by its sensor CA1 and to retrieve a result from the response picture. The analyzing means D1M2 is configured to associate the retrieved result with the command previously inserted into a previous command image. The command image and the corresponding response image may contain a common identifier allowing the device D1 to easily match the sent command with its result.

The device D1 comprises an initiator means D1M3 configured to generate and to display a first calibration image comprising a series of pixel patterns having a predetermined position relative to the other pixel patterns.

The device D1 comprises a setting means D1M4 configured to interpret a calibration picture corresponding to a calibration image displayed by the device D2. The setting means D1M4 is configured to get a setting data SG comprised in said calibration picture, to select a value VA1 of the protocol parameters based on the setting data SG and to activate the value VA1.

The device D2 comprises a screen D2S able to display images composed of pixels and a sensor means CA2 able to take a picture of an image.

The device D2 comprises a parsing means D2M1 configured to interpret a command picture taken by its sensor CA2 and to retrieve a command from said command picture.

The device D2 comprises a running means D2M5 configured to execute a command received from the device D1 and to generate a corresponding result.

The device D2 comprises a generating means D2M2 configured to generate a response image comprising the result. The generating means D2M2 uses the selected protocol parameters.

The device D2 comprises a calibration means D2M3 configured to analyze a calibration picture corresponding to the calibration image displayed by the device D1 and to identify a set ST comprising at least one detectable pixel pattern. The calibration means D2M3 is configured to select a setting data SG based on said set ST.

The device D2 comprises a negotiating means D2M4 configured to generate and display a calibration image comprising the setting data SG.

The sensor CA1 and CA2 may be a camera or a video camera for example.

Example of Negotiated Coding Calibration:
Assuming that one pixel pattern can have 16 colors, thus one Byte required two pixel patterns Assuming that an image comprises 50×50 pixel patterns. An image has 2 500 pixel patterns which correspond to 1250 bytes Assuming that 250 bytes are required for calibration data, it remains 1000 bytes for payload/image.

Note that the exchange mechanism is based on SIMPLE ACK

Example of Generic Transaction:

---

IMG0: START CALIBRATION IMAGE
ACK0: CALIBRATION RESPONSE IMAGE
IMG1: SELECT APPLICATION + GET CHALLENGE => Max 100 + 256
ACK2: RESPONSE 2
IMG3: AUTHENTICATE => Max 256 bytes
ACK3: RESPONSE 3
IMG4: PROCESSING => Max 256 bytes
ACK4: RESPONSE 4
IMG5: FINALIZE => Max 256 bytes
ACK5: RESPONSE 5

---

The baudrate depends on the screen display resolution, the screen display refresh rate and the camera capture speed.

The invention claimed is:

1. A method for negotiating a parameter of an optical communication protocol to be used between first and second devices,
wherein the method comprises the following steps:
said first device generates and displays a first calibration image comprising a series of pixel patterns each of said pixel patterns having a predetermined position relative to the other pixel patterns and a size different from the size of the other pixel patterns of the series,
said second device takes a first calibration picture of the first calibration image, analyses the first calibration picture, identifies a set comprising at least one detectable pixel pattern which is properly recognizable by the second device and selects a setting data based on said set,
said second device generates and displays a second calibration image comprising the setting data,
said first device takes a second calibration picture of the second calibration image, interprets the second calibration picture, gets the setting data, selects a value based on the setting data and updates the parameter with the value.

2. A method according to claim 1, wherein said set comprises the smallest detectable pixel pattern.

3. A method according to claim 1, wherein said first calibration image comprises a plurality of colored pixel patterns, each of said colored pixel patterns having a different color and wherein said set comprises the colored pixel patterns having a color which can be differentiated by said second device.

4. A method according to claim 1, wherein said first calibration image comprises a reference pattern having a predefined position in said first calibration image and wherein said second device detects the orientation of the first calibration picture with said reference pattern.

5. A method according to claim 1, wherein said second calibration image comprises a second series of pixel patterns, each pixel pattern of said second series having a predetermined position relative to the other pixel patterns of said second series,
wherein said first device identifies a second set comprising at least one detectable pixel pattern of said second series which is properly recognizable by the first device into said second calibration picture, and wherein said first device selects the value based on both the setting data and the second set.

6. A method according to claim 1, wherein the method comprises the further steps:
said first device generates and displays a command image comprising a command,
said second device takes a command picture of the command image, interprets the command picture, retrieves the command and generates a result by executing the command,
said second device generates and displays a response image comprising the result,
said first device takes a response picture of the response image, interprets the response picture, gets the result and associates the result with the command,
and wherein the command is coded into the command image through a combination of detectable pixel patterns belonging to said set.

7. A system comprising first and second devices, each device comprising a screen able to display images composed of pixels and a sensor able to take a picture of an image, said first and second devices being configured to communicate using an optical communication protocol,
wherein said first device comprises an initiator means configured to generate and to display a first calibration image comprising a series of pixel patterns, each of said pixel patterns having a predetermined position relative to the other pixel patterns and a size different from the size of the other pixel patterns of the series,
wherein said second device comprises a calibration means configured to analyze a calibration picture corresponding to the calibration image, to identify a set comprising at least one detectable pixel pattern which is properly recognizable by the second device and to select a setting data based on said set,
wherein said second device comprises a negotiating means configured to generate and display a second calibration image comprising the setting data, and
wherein said first device comprises a setting means configured to interpret a second calibration picture corresponding to said second calibration image, to get the setting data, to select a value based on the setting data and to update a parameter of the optical communication protocol with the value.

8. A system according to claim 7, wherein said set comprises the smallest detectable pixel pattern.

9. A system according to claim 7, wherein said first calibration image comprises a plurality of colored pixel patterns, each of said colored pixel patterns having a different color and wherein said set comprises the colored pixel patterns having a color which can be differentiated by said second device.

10. A system according to claim 7, wherein said first device comprises a coding means configured to code a command as a combination of pixel patterns into a command image, wherein said first device comprises an analyzing means configured to interpret a response picture taken by its sensor and to retrieve a result from said response picture and to associate the result with the command, wherein said second device comprises a parsing means configured to interpret a command picture taken by its sensor and to retrieve a command from said command picture, wherein said second device comprises a running means configured to generate a result by executing the command and wherein said second device comprises a generating means configured to generate a response image comprising the result.

\* \* \* \* \*